UNITED STATES PATENT OFFICE.

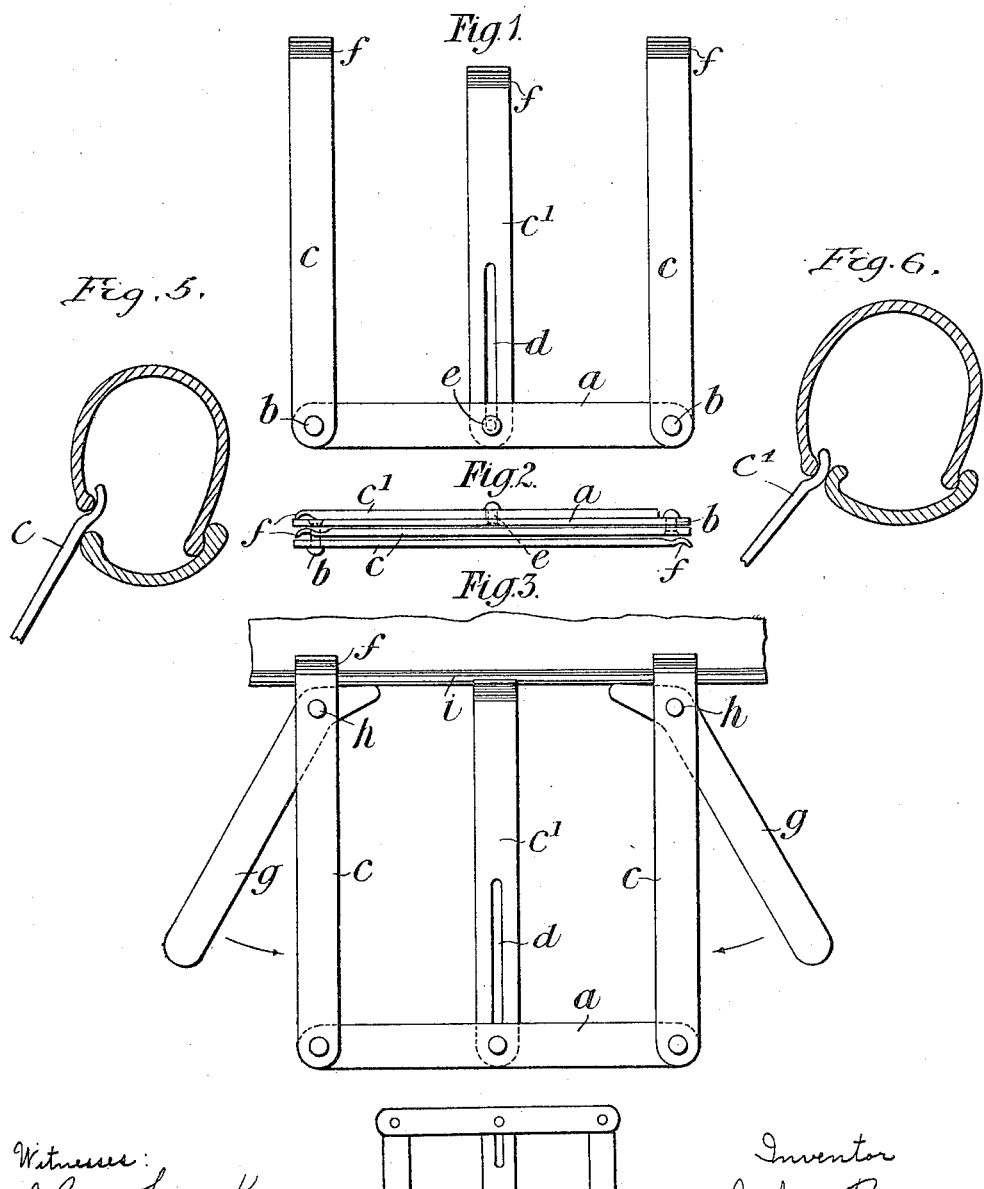

ARTHUR PASS, OF LETCHWORTH, ENGLAND.

TIRE-TOOL.

1,106,888.  Specification of Letters Patent.  Patented Aug. 11, 1914.

Application filed November 25, 1913. Serial No. 803,076.

*To all whom it may concern:*

Be it known that I, ARTHUR PASS, a subject of His Majesty the King of Great Britain, residing at 26 Leys avenue, Letchworth, Hertfordshire, England, picture framer, have invented a certain new and useful Improved Tire-Tool; and I do hereby declare the following to be a full, clear, and exact description of the invention, such as will enable others skilled in the art to which it appertains to make and use the same.

This invention relates to an improved tire lifter for pneumatic tires, the same being adapted to engage with the tire cover at at least three points simultaneously. Hitherto, so far as I am aware, no tire lifter has been known which is adapted to simultaneously engage with the cover edge at more than two points, and by constructing the tire lifter so as to be adapted to engage with the cover edge at an additional point or points simultaneously, the operation of removing a tire is very greatly facilitated.

A tire lifter in accordance with my invention would comprise a bar or handle having three lever arms pivoted thereto, one at each end and one intermediate. Each arm has a groove formed across its face close to its outer or free end, these grooves being adapted to engage with the edge of the cover when the lever arms are turned outward at right angles or so from the bar or handle. The intermediate or central arm should preferably be somewhat shorter, or extend a less distance from the bar or handle, than the others so that in applying the lifter to remove a tire, (the lifter when first inserted between the rim and cover being approximately perpendicular to the axis of the wheel) all three grooves may simultaneously engage with the curved tire edge. A further advantage of this is that when, using the bar as a handle, the device is levered downward or toward the wheel center, the shorter intermediate lever arm will naturally first draw that part of the cover edge engaged by it over the rim when the portions engaged by the outer lever arms readily follow.

To replace the tire the middle lever arm is folded out of the way and the outer lever arms passed beneath the cover edge with their grooves engaging the rim edge and the bar or handle levered upward or away from the wheel center when the cover at once slips into position. The lever arms being pivoted to the bar may not only be folded down so as to lie parallel therewith when not in use, after the fashion of the blades of a penknife, but the distance separating the ends of the outer lever arms when in use may be varied or adjusted to best suit the diameter of the wheel. Preferably the intermediate lever arm pivot passes through a longitudinal slot in said arm so that when the latter is folded down parallel with the bar or handle, it may be adjusted or moved longitudinally in relation to the bar so as not to project beyond the ends thereof. Adjustment of the central lever arm when applying the lifter to a tire is also permitted. In using such a device to remove a tire an outward pull is usually necessary before finally levering down, and to facilitate this outward pull I may pivot to each of the outer lever arms a supplementary lever the shorter arm of which is adapted to bear against the wheel rim, so that by pressing on these levers a powerful outward pull is obtained. Although it is preferable to pivotally connect the lever arms with the bar or handle for reasons shown above, at the same time this is not absolutely essential, and the device might in some cases be made with the lever arms integral with or rigidly fixed to the bar or handle.

In the annexed drawings in which similar letters refer to corresponding parts in all the figures:—Figure 1 shows in side elevation a tire lifter in accordance with my invention ready for use. Fig. 2 is an edge view showing the same closed or folded up, and, Fig. 3 is a side elevation showing a modified construction. Fig. 4 is a fragmentary side elevational view illustrative of the manner of inserting the tire tool in position to remove a tire from a rim; and Figs. 5 and 6 are vertical sectional views illustrative of successive steps in prying the tire out of the rim.

To the ends of the bar or handle $a$ are pivoted at $b$ the lever arms $c$, and with the center of the bar is pivotally connected the arm $c'$. This last arm is formed with a longitudinal slot $d$ through which its pivot $e$ passes, so that when all the lever arms are folded down upon the bar or handle $a$, as seen in Fig. 2, the arm $c'$ may be adjusted longitudinally of the bar $a$ so as not to extend beyond the end thereof and thus take up unnecessary space. Adjustment of the arm $c'$ in a longitudinal direction is also permitted if necessary when using the tire lifter. Across the face of each lever arm near its outer end is formed a groove $f$ adapted to engage the edge of the tire cover.

It will be noted that the central arm $c'$ is somewhat shorter than the outer arms $c$, so that when the lifter is first inserted between the rim and cover, the arms $c$ $c'$ being then approximately perpendicular to the axis of the wheel, the grooves $f$ of all these arms may simultaneously come opposite to and engage with the curved edge of the cover. This arrangement further, as before explained, causes that part of the cover edge engaged by the shorter central arm $c'$ to be first levered over the rim edge when levering pressure is applied to the lifter.

The pivotal connections between the lever arms and the bar $a$ would preferably be so arranged as to allow the said arms a certain amount of rock or play on their pivots so that when resting on the wheel rim at an angle to the plane of the wheel the lever arms may be able to accommodate themselves to the curve of the rim.

In Fig. 3 $g$ $g$ are supplementary levers pivoted at $h$ to the outer lever arms $c$. The shorter arms of these levers $g$ bear against the edge of the rim $i$ when the lifter is in position to draw the cover over the rim edge, and by pressing the longer arms of the levers toward the arms $c$ a powerful outward pull on the cover edge is obtained. If desired the shorter arms of the levers $g$ may carry small antifriction wheels or rollers adapted to bear on the rim.

Although I have described and illustrated a tire lifter having one intermediate arm, more than one intermediate arm might obviously be employed if desired; I prefer however the three armed arrangement, since a further increase in the number of arms would probably render the device less handy to manipulate.

What I claim and desire to secure by Letters Patent of the United States is:—

1. A tire tool, embodying therein a bar or handle, a lever arm carried near each end of said bar or handle, said lever arms having their free operative ends substantially the same distance from said bar or handle, a third lever arm carried by said bar or handle intermediate the first mentioned lever arms, the free operative end of said third lever arm being a shorter distance from said bar or handle than the free operative ends of said first mentioned lever arms, and means on said lever arms whereby, when the latter are thrust between the tire and the rim of a wheel parallel with the plane of the latter and said tool is turned, said arms will pry the tire out of and over the wheel rim.

2. A tire tool, embodying therein a bar or handle, a lever arm pivoted near each end of said bar or handle, said lever arms having their free operative ends substantially the same distance from said bar or handle, a pivot carried by said bar or handle intermediate said first mentioned lever arms, a third lever arm having an elongated slot engaging said pivot, said third lever arm having its free operative end a shorter distance from said bar or handle than said first mentioned lever arms, and means on said lever arms whereby, when the latter are thrust between the tire and the rim of a wheel parallel with the plane of the latter and said tool is turned, said arms will pry the tire out of and over the wheel rim.

3. A tire tool, embodying therein a bar or handle, a lever arm pivoted near each end of said bar or handle, said lever arms having their free operative ends substantially the same distance from said bar or handle, a third lever arm pivotally carried by said bar or handle intermediate the first mentioned lever arms, the free operative end of said third lever arm being a shorter distance from said bar or handle than the free operative ends of said first mentioned lever arms, whereby the free operative ends of all said lever arms are adapted to simultaneously engage a tire, a supplementary lever pivoted to each of said first mentioned lever arms, said supplementary levers being adapted to bear on the wheel rim, and means on said lever arms whereby, when the latter are thrust between the tire and the rim of a wheel parallel with the plane of the latter and said tool is turned, said arms will pry the tire out of and over the wheel rim.

In testimony whereof I have hereunto set my hand in the presence of two witnesses.

ARTHUR PASS.

Witnesses:
　TRACY LAY,
　O. J. WORTH.

---

Copies of this patent may be obtained for five cents each, by addressing the "Commissioner of Patents, Washington, D. C."